(No Model.) 5 Sheets—Sheet 1.
W. F. ALTENBAUGH.
MACHINE FOR AUTOMATICALLY GATHERING GLASS.
No. 584,138. Patented June 8, 1897.

(No Model.) 5 Sheets—Sheet 4.

W. F. ALTENBAUGH.
MACHINE FOR AUTOMATICALLY GATHERING GLASS.

No. 584,138. Patented June 8, 1897.

Witnesses:

INVENTOR
Wm. F. Altenbaugh
BY
Johnson and Johnson
ATTORNEYS.

United States Patent Office.

WILLIAM FRANCIS ALTENBAUGH, OF TIFFIN, OHIO, ASSIGNOR OF ONE-HALF TO GEORGE BEATTY, OF SAME PLACE.

MACHINE FOR AUTOMATICALLY GATHERING GLASS.

SPECIFICATION forming part of Letters Patent No. 584,138, dated June 8, 1897.

Application filed December 9, 1896. Serial No. 615,009. (No model.)

*To all whom it may concern:*

Be it known that I, WILLIAM FRANCIS ALTENBAUGH, a citizen of the United States, residing at Tiffin, in the county of Seneca and State of Ohio, have invented a new and useful Improvement in Machines for Automatically Gathering Glass in the Manufacture of Glassware, of which the following is a specification.

For gathering glass direct from the working pot or chamber and delivering it for its manufacture into the finished article I have produced a machine wherein such gathering and delivering operation is effected automatically.

For the manufacture of articles of glassware I employ a gathering iron or rod which, by the operation of the machine, is caused to move into the pot or chamber of the melted glass in an inclined position and gather and pick up upon its end a quota of the glass from the surface thereof, then rise and move away in an outward or backward direction, and by a sidewise swinging movement carry the gathered glass for conversion into the finished article. In this operation the gathering iron or rod has both a skimming and a rotary movement on the surface of the glass, and is caused to rise from the surface while still rotating in its reverse movement, and continuously maintains such rotation, and in its return movements to repeat the operation, this in effect doing the work of a skilled workman known as the "gatherer." In such machine my said improvements consist in certain novel parts and combinations of parts hereinafter specifically set forth in the claims concluding this specification. Before specifying such claims I will describe the machine illustrated in the accompanying drawings.

The following description read in connection with the drawings will enable any one skilled in the art to which my invention relates to understand its nature and to practice it in the form in which I prefer to employ it; but it will be understood that my invention is not limited to the precise form herein illustrated and described, as various modifications may be made without exceeding the scope of the concluding claims.

For the manufacture of glassware the gathering-iron is adapted for automatic operation within the working chamber or pot and for the delivery of the glass therefrom.

Referring to the drawings.

The machine is arranged in fixed relation to and extends from the working opening 2 of the working pot or chamber 3, and the carrier for the gathering rod or iron is mounted upon a carriage that is caused to travel toward and from said chamber-opening, so as to carry the gathering-iron into the working chamber above the surface of the glass, in contact with which the rod is caused to have a rotating gathering action and to bring out of the chamber the required quantity for the intended use. The molding-press 4, to which the gathering-iron is caused to carry the glass, is located at the side of the machine and a distance therefrom to be within the circle described by the lateral swinging movement of the gathering-iron, the limit of which movement is determined so as to bring the rod to a stop over the press.

Two horizontal frame-beams 5 5 extend from the opening 2 in the side of the working chamber and about on a level with the surface 6 of the molten glass therein. These beams are of a length suited to the travel of a carriage thereon to carry the gathering-rod 7 into and out of the chamber. For this purpose these beams form ways upon which a carriage is adapted to travel upon flanged wheels between the beams. Mediately of this carriage is secured a turn-table 9, having studs 10 between and in bearings of which is mounted a shaft 11, fitted to rotate, and upon which shaft between the said studs is loosely mounted a skeleton head 12, adapted to have a vertical swinging movement upon said shaft. This head extends from said shaft and is supported at its free end upon a spring-sustained stem 13, fitted to slide vertically in a guide 14 on the under side of the carriage. The bearing of the head is preferably made by curved arms 15, and within the head, connecting said arms, is mounted in position radially with and at right angles to the shaft an arbor or spindle which on its end next to said shaft has a bevel-gear 16 and on its other end has a chuck 17, within a socket of which is secured the end of the gathering-rod, which passes through a hole 18 in and is supported by the free end of the said head, so as to hold the rod, which projects a suitable distance from said head, from vibration in being operated.

On the turn-table shaft between one of the studs 10 and the bearing of the head is fixed a bevel-gear 19, which meshes with the bevel-gear 16 of the spindle, whereby the gathering-rod is given a rotary movement. This rotary movement is effected by a pulley 20 on one end of the shaft 11 in a way which I will presently state. By the construction stated it will be seen that provision is made for giving the gathering-rod a movement into and out of the working chamber, an axial rotation, and a vertical and a horizontal swinging movement upon the carriage, as I shall presently more particularly state. The glass, which is reduced to a condition suitable for press-molding and for blowing, is supplied to the working chamber or pot in any suitable way that will maintain therein a uniform level and from the surface of which the end of the rod is caused to pick up a quota as it revolves thereon.

At each end of the carriage a shaft 21 is mounted transversely in suitable bearings, and each shaft has a fixed sprocket-wheel 22, over which a sprocket-chain 23 passes and connects with each end of the carriage, whereby a reciprocating movement is imparted to the carriage to carry the gathering-rod into and out of the working pot or chamber.

At the bearing end of the rod-carrying head a weight 24 is fixed and adapted to nearly balance the gathering-rod and its carrier, whereby the said rod will have only sufficient preponderance to allow it to have a dipping movement at two positions in its work, for a purpose and in a way presently stated.

To a hanger 25 on the under side of the frame is pivoted a lever of two separate parts, one of which, 26, stands forward and is adapted to engage the lower end of the spring-sustained stem 13, on the upper end of which the free end of the gathering-rod head 12 is supported. The other lever part, 27, normally stands down and has an arm 28 in position to engage the stem-connected lever part 26, as in Fig. 2, in a way to pull down said stem against the tension of its sustaining-spring 28', so that when the stem is not pulled down it will be maintained in its normal position, holding the gathering-rod horizontal, as in Fig. 1.

Figure 2:
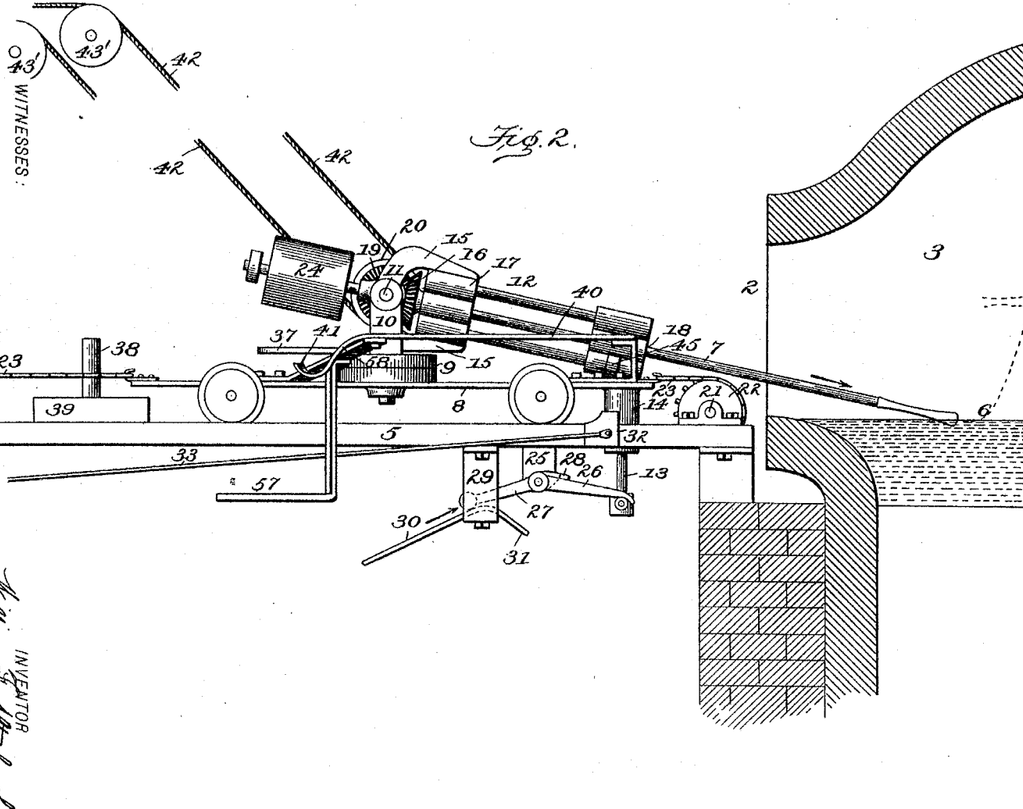
Fig. 2 is a similar view of so much of the machine as shows the gathering-rod as having entered the working chamber, dipped into the glass, and moving forward to gather it by skimming and rotating upon its surface.

In position near the working chamber or pot is a hanger 29, fixed to the under side of the frame and having a fixed incline standing downward from each side of the hanger. That side of this incline 30 which stands away from the working chamber is adapted to receive the lower end of said lever part 27 as the carriage moves forward to carry the gathering-iron into the furnace, and as said lever engages and rides up the incline the former is pushed back away from the furnace and brings its arm 28 into engagement with the upper lever part 26, bearing or pulling it down, and thereby pulling down its spring-sustained stem, the descent of which allows the free end of the rod-carrier 12 to fall gradually and the gathering-rod thereby to have a dipping movement simultaneously as it enters the chamber of the pot or reservoir, as in Fig. 2. The extent of this dipping movement is so governed by the incline 30 as to limit the contact of the gathering end of the rod to a partial immersion into the body of the glass, with a slight skimming action, as seen in Fig. 2. Having passed the limit of the depressing action of the incline 30, which is its highest point, the lever part 27 descends the other side 31 of the incline and dropping off said incline releases the depressing action upon the spring-sustained stem 13, which, under the tension of the spring, elevates said stem and the rod-carrier, and the engaging end of the lever part 26, acting as a stop, limits the ascent of the stem, brings the gathering-rod to a horizontal position, and supports it while moving back. The dropping of the lever off the incline allows the lever to hang down between the incline and the chamber, so that the lever will pass back and ride over the incline 31 to its normal position without acting upon the spring-sustained stem, in the reverse movement of the carriage, to withdraw the gathering-iron.

Figures 4, 5:
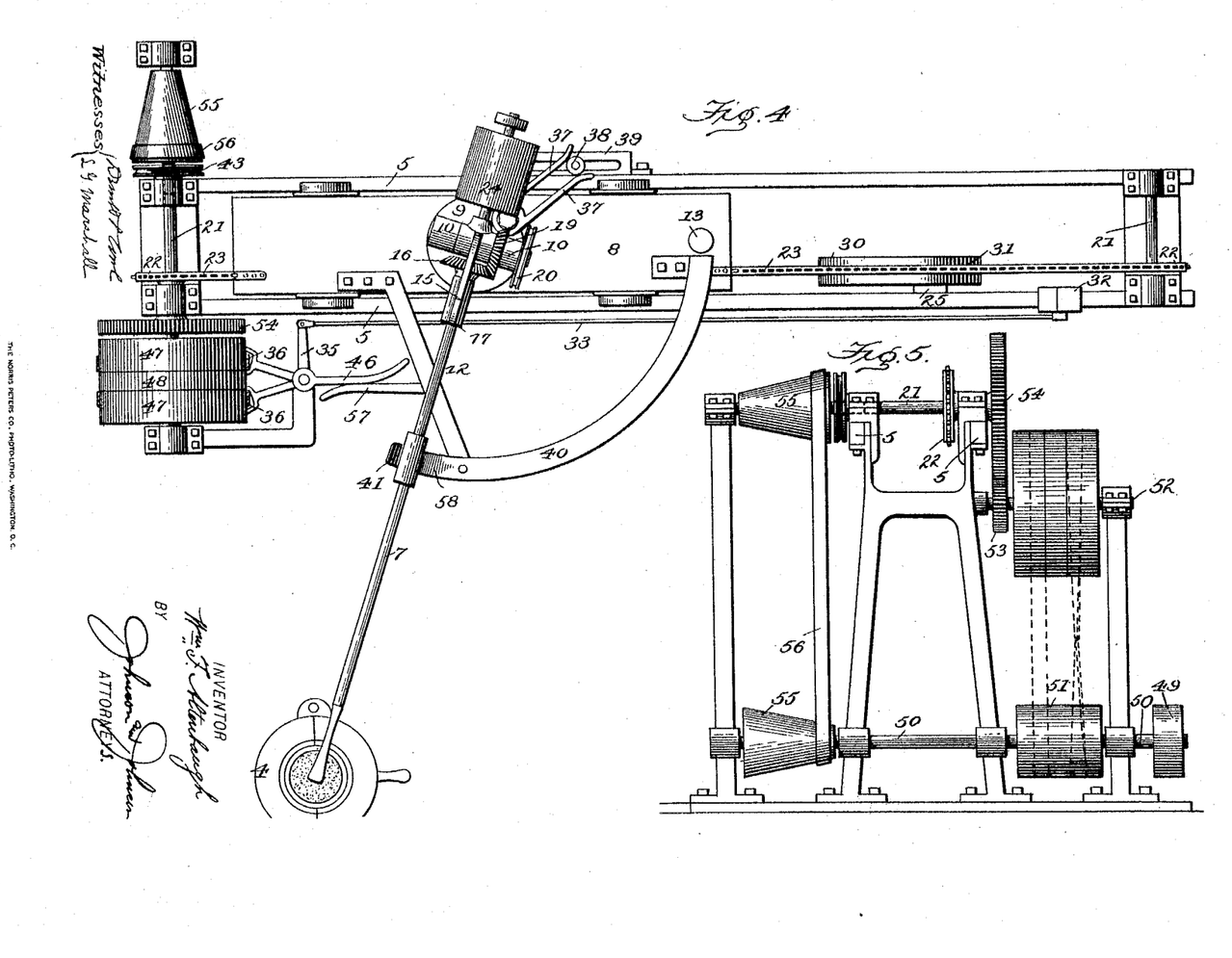
Fig. 4 is a like view of the machine, the gathering-rod being shown in the position it occupies when withdrawn from the working chamber and swung around at the side of the machine to deliver the glass to the press-mold.
Fig. 5 shows the gearing end of the machine.

It will be understood that except at the instant of reversing the movement of the carriage the movement of the rod into and from the working chamber will be continuous and in such movement its dipping will describe a curved path within the chamber. In this movement the gathering-rod will be continuously rotated by the rotation of its chuck. The reversal of the movement of the carriage to withdraw the gathering-iron from the working chamber or pot is effected as follows: As the forward movement of the carriage approaches its limit it is caused, preferably by one of its wheels, to come in contact with a slide 32 or other device movably seated upon or connected to the frame-beam, and so move or act upon said slide as to cause it by means of a connecting-rod 33 to shift the operating-belt, and thereby reverse the movement of the operating-gear and move the carriage back to the position as seen in Fig. 4. Any suitable belt-shifting device may be used for this purpose. As shown, the reversing-rod 33 extends from its connection with the slide 32 to a lever 35, pivoted at the gearing end of the frame, and which lever is suitably connected with belts 36 to shift them from a loose pulley for each belt to the fast pulley.

During the backward movement of the carriage an arm 37, preferably bifurcated, standing obliquely rearward from the turn-table, is carried into engagement with a roll 38, fixed upon the frame and located so as to cause it to act upon the oblique arm 37 as it moves back and turn said arm around outward, and thereby turn the turn-table and cause the gathering-rod carried by the turn-table to be swung around at the working side of the machine to carry the glass which had been gathered on the end of the rod to the press or other device. In this operation the position of the oblique arm becomes reversed, so as to stand forward, having made nearly a half-revolution. The roll 38, which engages the turn-table arm 37 to effect this sidewise swinging movement of the gathering-rod as it is moving back, is fixed in a bracket 39 at the rear side of the frame, and said roll is made adjustable lengthwise of the frame, so as to limit the swinging movement of the gathering-rod to bring it exactly over the press-mold 4 for the delivery of the glass therein. This limiting the movement of the carriage is made automatic by the action of a cam-arm 57, which, as the carriage moves back, strikes the cam-arm 46 and shifts the belt-shifting lever 35, which stops the movement of the carriage, as seen in Fig. 4, by placing both belts on the loose pulleys. The gathering-rod remains in this position long enough to allow the operator to cut off the glass from the rod and drop it into the mold.

In the lateral swinging of the gathering-rod I provide for supporting the free end of the rod-carrier a horizontal ledge or way 40, preferably fastened to and carried by the carriage and terminating in a depressed seat 41, whereby at the limit of the lateral swinging movement of the gathering-rod it is caused to dip and be held over and close to the top of the chamber of the press-mold to deliver therein the glass.

Figure 1:
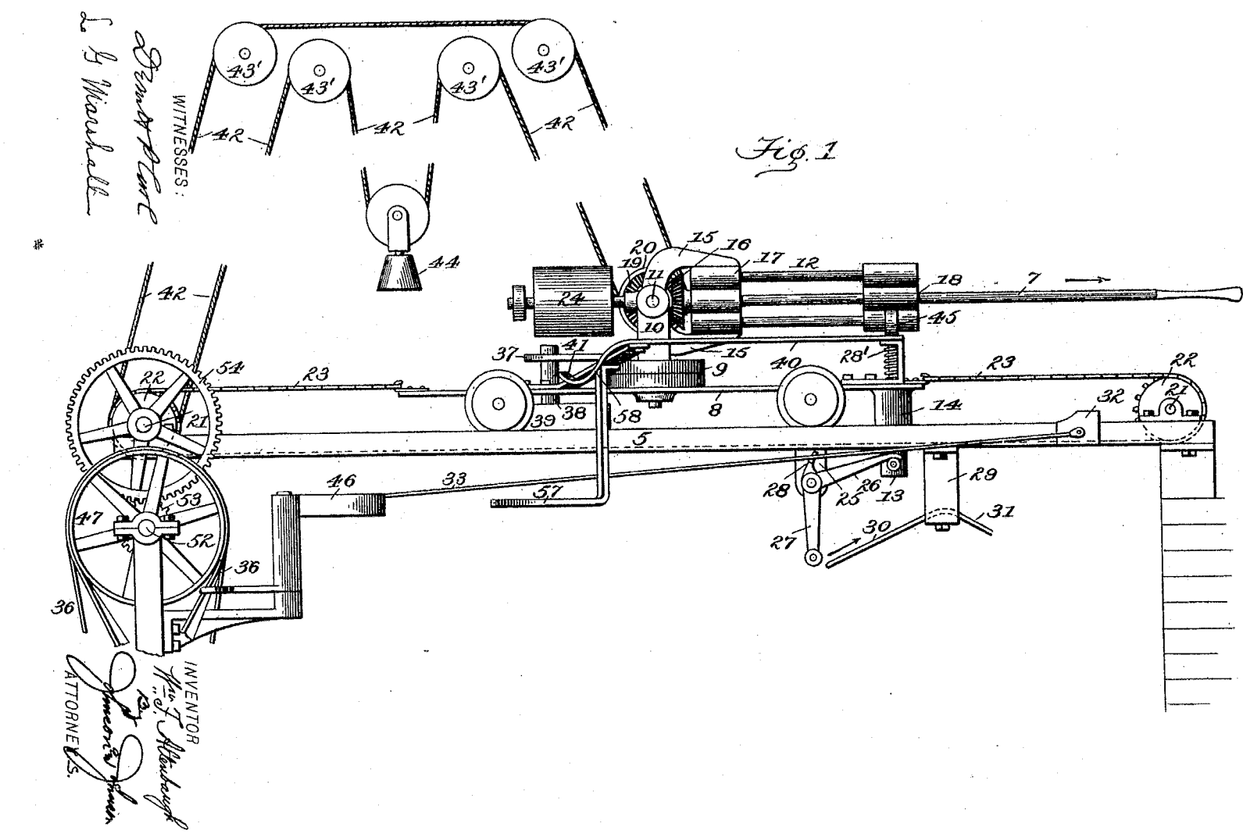
Figure 1 represents in side elevation a machine embracing my invention as organized for gathering glass from the pot or working chamber in the operation of producing pressed ware, the gathering-rod being shown in the position it occupies in its forward movement into the working chamber or pot.

It will be understood that the gathering-rod is continuously rotated to pick up a quota of glass and hold it thereon while this rod is being moved into and away from the working chamber or pot to the press. The means for effecting this rotation while the carriage is both moving and standing still I will now describe. A pulley 20 on the end of the turn-table shaft drives the bevel-gear 19 thereon, which drives the gear 16 of the chuck-spindle and rotates the gathering-rod. A rope 42, leading from a pulley 43 on the shaft 21, which operates the carriage, leads to and operates the pulley 20 on the turn-table shaft, there being intermediate pulleys 43', over which the rope passes with considerable slack and has a weight 44 to maintain the driving power of the rope on the turn-table shaft while the carriage is moving back and forth as well as during the turning of the turn-table to swing the gathering-iron out at the side of the machine, as seen in Figs. 1 and 4.

Figure 3:
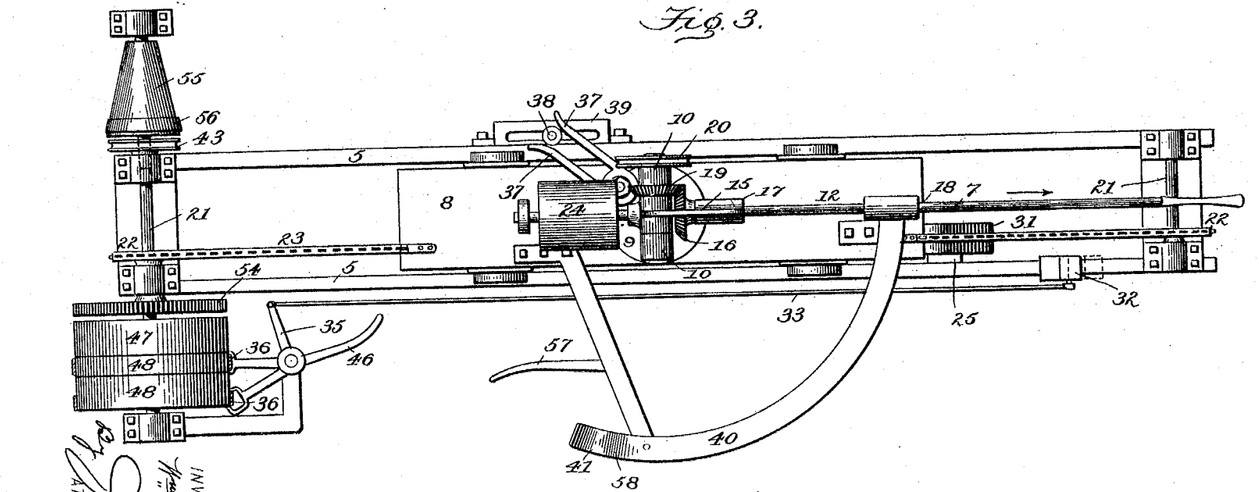
Fig. 3 is a top view of the machine in the position it occupies in Fig. 1.

The swinging movement of the gathering-rod is rendered easy by the provision of a roll 45 at the under side of the free end of the rod-carrier, so that the latter rolls from off the upper end of the spring-sustained stem 13, on which it rests, directly onto the ledge or way 40, which extends out from the side of the carriage. It is important also to notice that the supporting ledge or way terminates in a gradual incline 58 and in a concave seat 41, so that the rod has an easy dipping movement in passing to the seat and has an easy rise from its seat when the carriage is started forward and the turn-table is thereby revolved. This rise of the rod-carrier from its seat and the return swinging movement of the rod to its position in line with the frame to again enter the working chamber or pot for another quota of glass is effected by the reverse action of the turn-table guide-arm 37 on the fixed roll 38 as the carriage moves forward, as seen in Fig. 4. This forward movement of the carriage is effected at the time the glass is cut off and delivered from the rod by shifting the belts. This may be done by the presser moving inward the arm 46 of the shifting-lever 35, which at once starts the carriage forward by its chain connection with the driving-gear and simultaneously swings the gathering-rod back in position to enter the working chamber or pot by the action of the turn-table arm on the fixed roll. In Fig. 4 the shifting-lever 35 is in position, having placed the belts on the loose pulleys 47, which are on each side of the fast pulley 48, and stopped the backward movement of the carriage to give time to deliver the glass into the press. In this shifting movement the belt-shifting rod 33, with its slide 32, is drawn back, which places the said shifting-slide in position to be acted upon and moved forward again as the carriage moves forward to carry the gathering-iron into the pot. Such shifting movement also reverses the movement of the carriage by changing the belts on the fast pulley to withdraw the gathering-iron again from the working chamber or pot by moving the slide to the position seen in dotted line in Fig. 3.

The provision of the weight is only to counterbalance the gathering-rod and its carrier sufficient to render the swinging and rising movements of the rod easy, and for this purpose the weight may be adjusted on the rod-carrier to or from its bearing.

The machine is operated by a power-driven pulley 49 on a shaft 50, on which is the long pulley 51, that drives the shifting belts, one of which is crossed. The fast and loose pulleys are mounted upon a shaft 52 at the side of the frame, on which shaft there is a spur-gear 53, which engages a gear 54 on the shaft 21, which has the carriage-driving gear.

The power-driven shaft and a separate short top shaft, preferably mounted in the same journal-box as the carriage-driving shaft, are each provided with a cone-pulley 55, which provides, by adjusting their connecting-belt 56 thereon, for changing the speed of the rotation of the gathering-iron to suit the desired rapidity of rotation of the gathering-rod in the glass. These separate top shafts are shown as having their abutting ends in the same journal-box. (See dotted lines in Figs. 3, 4, and 5.)

The machine shown is adapted for operating the gathering iron or rod in a horizontal position or plane, but it may be adapted to have a vertical swinging movement to deliver the gathered glass, as stated.

The machine by its automatic operation takes the place in the factory of a skilled workman; and its method of operation gives the gathering-iron a positive and exact movement for every gathering in the pot and from the pot to the press with the gathered glass and renders the gathering more uniform than can be done by hand, which is an important matter in picking up and delivering the proper quota of glass for every article. This advantage is due to the fact that the gathering-iron in contact with the glass has certain and regular movements, skimming forward and rotating upon the surface of the glass in the same time and at the same depth in the glass at every gathering.

In the operation of the machine the gathering-rod, before its entrance into the pot or reservoir, is preferably caused to dip and assume an inclined position, so as to bring its gathering end, while still moving forward, to skim along the surface of the glass and by its rotation gather the proper quota of glass thereon. This dipping movement of the rod is only sufficient to cause its contact with the surface of the glass and to remain in such contact to wind around it a sufficient body of glass from which to make the intended article. In this skimming action the rod moves only about two or three inches, and its depth into the glass is regulated and determined by the pitch of the incline 30 over and upon which the rod-depressing lever 27 rides. As soon as the highest point of the incline is passed the lever 27 relieves itself of the incline and the gathering-rod quickly rises to a horizontal position, rotating all the while to hold the glass which it picked up, as in Fig. 2. This rising movement is effected by the lifting action of the spring-sustained stem 13, which is caused to rise by the action of the coil-spring 28 when the depressing-lever passes off the incline. As the gathering-rod rises the carriage still moves forward a short distance and comes in contact with the slide 32, pushes it forward, and by its rod connection 33 with the shifting-lever 35 shifts the belts and reverses the movement of the carriage. This backward movement of the carriage brings the arm 37 of the turn-table in engagement with the fixed roll 38, thereby rotating the turn-table and swinging the gathering-rod around to bring the end of the rod to the press-mold. At the limit of this swinging movement the carriage is stopped and the rod is caused to dip over the top of the mold into which the glass is dropped. For the delivering of the glass the carriage is brought to a standstill by the automatic shifting of the belts by the cam-acting arms 46 and 57 or other suitable shifting device, but the rotation of the gathering-rod continues. As soon as the glass is delivered from the rod the carriage is started forward by shifting the belts by hand or otherwise, and the gathering-rod by the action of the bifurcated arm and fixed roll swings back into line with the frame and is carried forward to repeat the gathering operation while the operator is finishing an article. As the carrier of the gathering-rod swings out on the supporting ledge or way the seat in the latter forms a stop to prevent the gathering-rod from going beyond the point which brings it over the press or other device, and this stopping of the swinging movement of the gathering-rod is simultaneous with the stopping of the carriage.

As the gathering function of the iron or rod is essentially its automatic rotation upon the surface of the glass, it is obvious that such gathering may be effected by the inward or by the outward movement of the iron while in contact with the glass and that the iron or rod may have a dipping movement either while entering the chamber or while leaving it.

Figure 6:
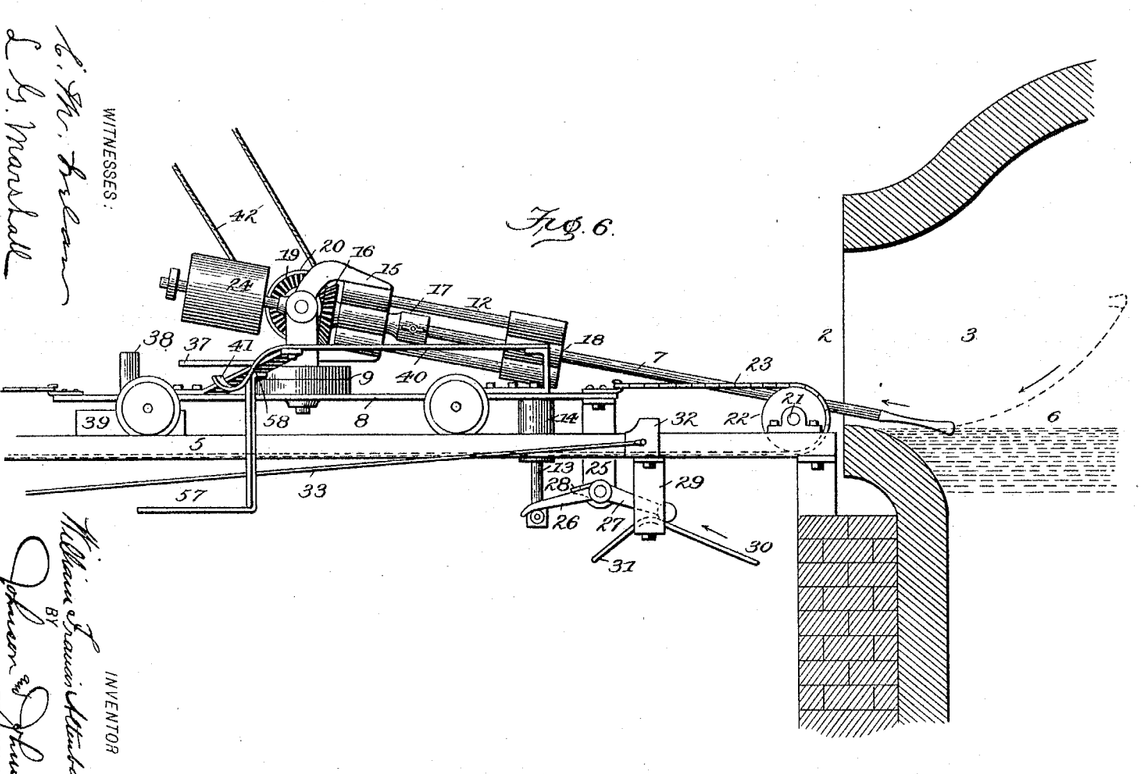
Fig. 6, Sheet 5, represents so much of the machine as is adapted for gathering glass in the operation of producing blown glassware and wherein an interchangeable blowpipe is used as the gatherer in the machine in the place of the solid rod.

For effecting the dipping gathering operation in the manufacture of blown ware I have shown in Fig. 6 a modification wherein a blowpipe is used for gathering the glass in the place of the solid rod. For this work the blowpipe is caused to move into the working chamber or pot and to dip on its return or outward movement into the glass with a skimming gathering rotation thereon. The object of this change in the initial movement of the gathering-rod is to prevent the filling or clogging of the blow-orifice in the pipe while picking up the quota of glass required for the article. In this operation the blowpipe is made interchangeable, so that while the "blower" is manipulating one blowpipe in finishing the article the machine is supplied with another blowpipe, which is swung and carried forward to repeat the gathering operation. The provision for using a blowpipe with an outward dipping movement consists in reversing the position of the lever device 26 and 27 and reversing the position of the inclines 30 and 31 from that shown in Fig. 1 to that shown in Fig. 6. In this change the lever 26 will stand forward and the incline 30 will stand rearward, as in Fig. 6. These parts in their reversed positions will cause the gathering-pipe to be carried into the working chamber above the surface of the glass, in contact with which the end of the blowpipe is caused to have a rotating gathering action while it is moving out of the chamber to bring the required quantity of glass to a position for use with a forming-block. In this operation the forming-block takes the place of the press-mold shown in Fig. 4 and the lateral swinging movement of the pipe is determined so as to bring it over the forming-block, whereon the mass is rotated to give it a cylindrical form preparatory to the removal of the blowpipe from the machine. In this operation the gathering-blowpipe while rotating moves horizontally into the working chamber to its limit, as shown by dotted lines in Fig. 6, which limit is determined by the action of the belt-reversing device, by which the advance of the carriage is arrested and its movement reversed. At the same time the lever device 27 of the carriage comes in contact with and moves upon the incline 30, the action of which causes the gathering-blowpipe to dip in a curved path, as shown by the arrow, into and skim along the surface of the glass and by its rotation and backward movement thereon gather the proper quota of glass upon its end. As soon as the highest point of the incline is passed the lever 27 relieves itself of the incline and the blowpipe rises to a horizontal position, rotating all the while to hold the glass which it has picked up. As the carriage moves back the blowpipe swings out and around to the forming-block, and the proper forming of the glass on the blowpipe having been completed the blower removes the blowpipe and puts another in its place and the operation is repeated.

It will be understood that many of the devices above described are not essential to the several features of my invention separately considered. This will be indicated in the concluding claims, as in any given claim the omission of an element or the omission of reference to the particular features of the elements mentioned is intended to be a formal declaration of the fact that the omitted elements or features are not essential to the invention therein covered. The uniform level of the glass in the working chamber is maintained by communication with the melting-furnace.

I claim as my invention—

1. For gathering glass in the manufacture of glassware, a gathering-iron and means automatically to operate the iron to gather glass in a chamber or pot by a skimming and a rotating action upon the surface of the glass.

2. In a machine for gathering glass in the manufacture of glassware, a gathering-iron, and a carriage therefor, and mechanism automatically for moving said carriage and said iron to the working chamber or pot and to give to said rod a dipping, a skimming and a rotating movement upon the surface of the glass, to move the iron out of the working chamber and to deliver the glass at the side of the machine.

3. For gathering glass in the manufacture of glassware, a gathering-iron mounted for automatic operation within the glass-chamber with an advancing, rotating and dipping movement, means for limiting such dipping movement to a skimming gathering action on the surface of the glass, and means for raising and for carrying the gathering-iron out of the working chamber in the continuous operation of the machine.

4. In a machine for gathering glass in the manufacture of glassware, a gathering-iron mounted and adapted for automatic operation within a chamber with gathering movements controlled with respect to the level of the glass in the chamber and with the surface of the glass.

5. For gathering glass in the manufacture of glassware, a gathering-iron, means automatically to present to and rotate the iron upon the surface of the glass within said chamber, to gather a quota and bring it away from the chamber.

6. The combination in a machine for gathering glass in the manufacture of glassware, a gathering-iron, mechanism pivotally supporting said iron, and mechanism automatically to reciprocate it into and from the glass-chamber, to give said iron an axial rotation and a dipping movement into the chamber and a lateral swinging movement out of said chamber.

7. In a machine for gathering glass in the manufacture of glassware, a carriage, and a gathering-iron carried thereby into and from the glass-chamber, means for rotating said gathering-iron upon the surface of the glass, and mechanism automatically to cause a reverse movement of the carriage to and from the chamber, and to the gathering-iron out at the side of the carriage, the limit of the reverse movement of the carriage and sidewise swing of the gathering-iron being simultaneous.

8. In a machine for gathering glass in the manufacture of glassware, a carriage, a chuck-spindle pivotally mounted on said carriage, a gathering-iron secured in said chuck, means for rotating said chuck, and a spring-sustained support in said carriage, a device on the carriage and a fixed incline device cooperating therewith upon the forward movement of the carriage, whereby the gathering-iron is caused to dip and skim upon the surface of the glass in a chamber and to resume a horizontal position in its movement out of said chamber.

9. The combination in a machine for gathering glass in the manufacture of glassware, a carriage, a turn-table on a carriage, a chuck-spindle pivotally mounted on said turn-table, a gathering-iron secured in said chuck, a weight mounted on the pivoted end of said chuck, and a spring-sustained stem on said carriage for supporting the gathering-iron, and mechanism for operating the carriage, the gathering-iron, the turn-table, and the spring-sustained stem, in the way and for the purpose stated.

10. In a machine for gathering glass in the manufacture of glassware, a carriage, a turn-table, a shaft mounted in, a carrier pivotally mounted on said shaft having a chuck-spindle, a gathering-iron secured in said chuck-spindle and supported in said carrier, a gear on said shaft engaging a gear on the chuck-spindle, a driving-pulley on said shaft, and a spring-sustained support for said chuck-carrier, and mechanism for operating the carriage, the gathering-iron, the turn-table, and the spring-sustained support for the chuck-carrier in the way and for the purpose stated.

11. For gathering glass in the manufacture of glassware, a carriage, a turn-table, and a gathering-iron pivotally mounted on the turn-table, means for automatically dipping said iron in its gathering action, means for automatically swinging said gathering-iron out at the side of the carriage, and means for reciprocating said carriage, consisting of a chain connecting the carriage with the driving power, a slide adapted to be actuated by the carriage, a belt-shifter and a rod between said slide and shifter.

12. The combination in a machine for gathering glass in the manufacture of glassware, a carriage, a turn-table, a carrier pivotally mounted on said turn-table and having a chuck-spindle, a gathering-iron secured in said chuck and supported in said carrier, mechanism for automatically reciprocating the carriage and for operating the gathering-iron in the way described, a bifurcated arm fixed on the turn-table, and a fixed roll or stud in the way of said arm whereby said arm is caused to engage the fixed roll in the reciprocating movements of the carriage and cause the gathering-iron to have a swinging movement around at the side of the carriage, and return to its normal position.

13. In combination in a machine for gathering glass in the manufacture of glassware, a carriage, a gathering iron or rod pivotally mounted thereon and supported for a dipping and for a side-swing movement upon said carriage in relation to a glass-containing chamber and a molding-press or other finishing device, means for automatically reciprocating said carriage, means for automatically dipping said gatherer, means for automatically causing a side-swing movement to said gatherer, means mounted on said carriage for automatically rotating said gatherer, and means on said carriage for determining its reciprocating and its laterally-swinging movements.

14. For gathering glass in the manufacture of glassware, a gathering-iron, a carrier therefor, a turn-table on which said carrier is pivotally mounted, a carriage on which said turn-table is mounted, mechanism for automatically reciprocating the carriage, mechanism for continuously rotating the gathering-iron and mechanism for automatically swinging the gathering-iron at the side of the machine to deliver the gathered glass, and mechanism for limiting said delivering movement.

15. For gathering glass in the manufacture of glassware, a gathering-iron, a carrier therefor, a turn-table on which the carrier is pivotally mounted, and a carriage for the turn-table, mechanism for automatically reciprocating the carriage, mechanism for continuously rotating the gathering-iron, mechanism for automatically dipping the gathering-iron upon the surface of the glass, means for limiting such dipping, mechanism for automatically swinging the gathering-iron at the side of the machine to deliver the glass, mechanism for automatically limiting its swinging laterally of the iron, and means whereby it is caused to have a dipping movement.

16. In combination in a machine for gathering glass in the manufacture of glassware a gathering iron or rod pivotally mounted at one end and having a support adapted to be depressed on the advance movement of the iron in its gathering function, and an unyielding support for said iron in swinging out sidewise to deliver the gathered glass, and means for automatically and continuously rotating the gathering-iron in its movements and means for automatically depressing and for elevating the gathering-rod.

17. In combination in a machine for gathering glass in the manufacture of glassware, a carriage, a turn-table on the carriage, a gathering-iron on the turn-table, a carrier for the gathering-iron, pivotally mounted on the turn-table, means for automatically reciprocating the carriage with respect to a working glass-chamber, means for automatically swinging the gathering-iron out at the side of the carriage, and a ledge or way fixed on the carriage adapted to support the carrier in its laterally-swinging movements with the gathering-iron.

18. For gathering glass in the manufacture of glassware, a carriage and means for automatically reciprocating it with respect to glass-chamber, a turn-table on the carriage, a carrier for the gathering-iron pivotally mounted upon the turn-table, means for automatically rotating the gathering-iron, a spring-sustained support for said carrier, a lever device on the carriage, and a fixed incline, the said lever device and the fixed incline being adapted to coöperate to operate the spring-sustained support to cause the gathering-iron to have a dipping movement as it advances to skim the surface of the glass.

19. For gathering glass in the manufacture of glassware, a carriage, a turn-table on the carriage, and a gathering-iron mounted upon said turn-table, means for automatically dipping said iron in its gathering action, means for automatically reciprocating the carriage with respect to a glass-working chamber, and means for automatically swinging the gathering-iron out at the side of the carriage, consisting of an arm or projection on the turn-table, and a fixed roll or stud adapted to be engaged by said arm to turn the table and with it to swing the gathering-iron out sidewise and back to its normal position by the reciprocating movement of the carriage.

20. In a machine for gathering glass in the manufacture of glassware, a frame having a fixed relation to and extending from the working opening of said chamber about on a level with the glass therein, an automatically-reciprocating carriage, an automatically-operating turn-table thereon, a gathering-iron on the turn-table, and means for automatically swinging said iron out at the side of the machine, and for continuously rotating it while so being swung, and a ledge or way terminating in an incline and a seat, movable with the carriage and adapted to support the pivoted carrier in its laterally-swinging movement and allow it to dip to present the gathering-iron and its gather for other operation.

21. In a machine for gathering glass in the manufacture of glassware, a carriage, a chuck-spindle pivotally mounted on the carriage, means for rotating said chuck-spindle, a gathering-iron secured in said chuck, and a spring-sustained support for said iron, two separate lever parts on the carriage, one lever part standing forward and adapted to engage the spring-sustained support, and a double incline on the frame, one incline part adapted to engage the other depending lever part and cause the latter to engage the forward-standing lever part, whereby to pull down the spring-sustained support and allow the gathering-iron to have a dipping movement into a glass-containing chamber, the other incline part serving to trip the depending lever and thereby release the depending lever and allow the gathering-iron to be raised.

22. For gathering glass in the manufacture of glassware, a carriage and means for automatically reciprocating it with respect to a glass-chamber, a turn-table on the carriage, a gathering-iron, means pivotally to mount the said iron on the turn-table, means for automatically rotating the gathering-iron, consisting of a gear on said pivotally - mounting means, a shaft and a gear mounted on the turn-table, a pulley on the shaft of the gear on the turn-table and a driving power having a pulley, a weighted slack rope connecting said pulley, and means for causing the gathering-iron to have a skimming movement on the glass, consisting of a fixed incline, a depressing-lever on the carriage adapted to engage the incline, a spring-sustained stem on the carriage adapted to support the gathering-iron, and a lever on the carriage adapted to engage the spring-sustained stem and to be engaged by the said depressing-lever, the said incline adapted to enable the said depending lever on the forward movement of the carriage to depress the spring-sustained stem and to trip said lever to render it non-active on the return movement of the carriage.

23. For gathering glass in the manufacture of glassware, a gathering iron or rod and mechanism automatically to rotate the rod axially and cause it in the gathering operation to move onto the surface of the glass while under axial rotation and to have a vertical horizontal swinging movement to deliver the gathered glass to be finished.

24. A mechanically-operated gathering iron or rod for gathering glass in the manufacture of glassware, means automatically for controlling and presenting it to the surface of the glass to be gathered and means automatically for withdrawing the gatherer with its gather of glass and presenting the gather to a device having a fixed relation to the chamber containing the glass.

25. In the manufacture of glassware, an automatic reciprocating and rotating gathering instrument mounted and operated to gather and pick up a quota of glass by an automatic reciprocating and rotating movement upon the surface of the glass, and means automatically operated to present the instrument for operation to a device to finish the article and means operating automatically to determine such movements.

WILLIAM FRANCIS ALTENBAUGH.

Witnesses:
JAMES Y. WEY,
LOLA R. METZ.